(12) United States Patent
Yogo et al.

(10) Patent No.: US 12,296,719 B2
(45) Date of Patent: May 13, 2025

(54) BRAKING CONTROL DEVICE FOR VEHICLE

(71) Applicant: ADVICS CO., LTD., Kariya (JP)

(72) Inventors: Kazutoshi Yogo, Kariya (JP); Akihito Kusano, Kariya (JP)

(73) Assignee: ADVICS CO., LTD., Kariya (JP)

( * ) Notice: Subject to any disclaimer, the term of this patent is extended or adjusted under 35 U.S.C. 154(b) by 581 days.

(21) Appl. No.: 17/633,313

(22) PCT Filed: Aug. 3, 2020

(86) PCT No.: PCT/JP2020/029638
§ 371 (c)(1),
(2) Date: Feb. 7, 2022

(87) PCT Pub. No.: WO2021/024977
PCT Pub. Date: Feb. 11, 2021

(65) Prior Publication Data
US 2022/0281321 A1 Sep. 8, 2022

(30) Foreign Application Priority Data
Aug. 8, 2019 (JP) ................ 2019-145902

(51) Int. Cl.
*B60L 7/24* (2006.01)
*B60T 13/14* (2006.01)
(Continued)

(52) U.S. Cl.
CPC .............. *B60L 7/24* (2013.01); *B60T 13/148* (2013.01); *B60T 13/662* (2013.01); *B60T 13/686* (2013.01); *B60T 2270/604* (2013.01)

(58) Field of Classification Search
CPC .... B60L 7/24; B60L 7/26; B60L 50/53; B60T 13/686; B60T 13/662; B60T 13/148; B60T 2270/604; B60T 8/17; B60T 13/68
See application file for complete search history.

(56) References Cited

U.S. PATENT DOCUMENTS

2012/0212044 A1 8/2012 Nakamura et al.
2017/0066331 A1 3/2017 Jeon et al.
(Continued)

FOREIGN PATENT DOCUMENTS

CN 102596664 A 7/2012
JP 2017052502 A 3/2017
(Continued)

OTHER PUBLICATIONS

WO document No. WO 2021020369 to Yogo et al published on Feb. 4, 2021.*

(Continued)

*Primary Examiner* — Pamela Rodriguez
(74) *Attorney, Agent, or Firm* — BUCHANAN INGERSOLL & ROONEY PC (57) ABSTRACT

A braking control device includes an electrically driven pressure control unit, front-wheel and rear-wheel supply paths that supply a brake fluid pressurized by the pressure control unit to front-wheel and rear-wheel wheel cylinders, front-wheel and rear-wheel supply valves and provided in the front-wheel and rear-wheel supply paths, and a controller that drives the pressure control unit and the front-wheel and rear-wheel supply valves. In the braking control device, at least one of the front-wheel and rear-wheel supply valves is a linear valve.

3 Claims, 4 Drawing Sheets

(51) Int. Cl.
  *B60T 13/66*  (2006.01)
  *B60T 13/68*  (2006.01)

(56) References Cited

U.S. PATENT DOCUMENTS

| | | | |
|---|---|---|---|
| 2017/0240154 A1* | 8/2017 | Kashiwai | B60T 13/146 |
| 2018/0086209 A1* | 3/2018 | Jeon | B60T 8/17 |
| 2019/0092303 A1 | 3/2019 | Kato et al. | |
| 2020/0282840 A1* | 9/2020 | Yamamoto | B60T 13/18 |

FOREIGN PATENT DOCUMENTS

| | | |
|---|---|---|
| JP | 2019059458 A | 4/2019 |
| WO | 2019108761 A1 | 6/2019 |

OTHER PUBLICATIONS

International Search Report (PCT/ISA/210) with translation and Written Opinion (PCT/ISA/237) mailed on Sep. 1, 2020, by the Japan Patent Office as the International Searching Authority for International Application No. PCT/JP2020/029638. (8 pages).

* cited by examiner

BRAKING CONTROL DEVICE FOR VEHICLE

TECHNICAL FIELD

The present disclosure relates to a braking control device for a vehicle.

BACKGROUND ART

The applicant has developed a braking control device for a vehicle as described in Patent Literature 1. In the braking control device, different fluid pressures can be simultaneously applied to a front wheel and a rear wheel by a pressurizing configuration using an electric motor (such control is referred to as "independent control"). Specifically, in order to perform the independent control, the braking control device is provided with: a fluid pressure generation unit that adjusts a fluid pressure generated by the electric motor to obtain an adjusted fluid pressure and applies the adjusted fluid pressure as a rear-wheel brake fluid pressure; and a fluid pressure correction unit that reduces and adjusts the adjusted fluid pressure to obtain a corrected fluid pressure and applies the corrected fluid pressure as a front-wheel brake fluid pressure. Such a braking control device is desired to have a simpler configuration.

CITATIONS LIST

Patent Literature

Patent Literature 1: JP 2019-059458 A

SUMMARY

Technical Problems

An object of the present disclosure is to provide a braking control device capable of applying different fluid pressures to a front wheel and a rear wheel with a simplified configuration.

Solutions to Problems

A braking control device for a vehicle according to the present disclosure includes a "pressure control unit (YC) to be electrically driven", "front-wheel and rear-wheel supply paths (HKf, HKr) that supply a brake fluid (BF) pressurized by the pressure control unit (YC) to front-wheel and rear-wheel wheel cylinders (CWf, CWr)", "front-wheel and rear-wheel supply valves (VKf, VKr) provided in the front-wheel and rear-wheel supply paths (HKf, HKr)", and a "controller (ECU) that drives the pressure control unit (YC), and the front-wheel and rear-wheel supply valves (VKf, VKr)". In the braking control device for a vehicle, a linear valve is adopted for at least one of the front-wheel and rear-wheel supply valves (VKf, VKr).

A braking control device for a vehicle according to the present disclosure is applied to a vehicle, which includes a regenerative generator (GN) on a front wheel (WHf) of the vehicle, and includes a "pressure control unit (YC) to be electrically driven", "front-wheel and rear-wheel supply paths (HKf, HKr) that supply a brake fluid (BF) pressurized by the pressure control unit (YC) to front-wheel and rear-wheel wheel cylinders (CWf, CWr)", "front-wheel and rear-wheel supply valves (VKf, VKr) provided in the front-wheel and rear-wheel supply paths (HKf, HKr)", a "controller (ECU) that drives the pressure control unit (YC), and the front-wheel and rear-wheel supply valves (VKf, VKr)". In the braking control device for a vehicle, the front-wheel supply valve (VKf) is a linear valve. In addition, the rear-wheel supply valve (VKr) may be an on/off valve.

A braking control device for a vehicle according to the present disclosure is applied to a vehicle, which includes a regenerative generator (GN) on a rear wheel (WHr) of the vehicle, and includes a "pressure control unit (YC) to be electrically driven", "front-wheel and rear-wheel supply paths (HKf, HKr) that supply a brake fluid (BF) pressurized by the pressure control unit (YC) to front-wheel and rear-wheel wheel cylinders (CWf, CWr)", "front-wheel and rear-wheel supply valves (VKf, VKr) provided in the front-wheel and rear-wheel supply paths (HKf, HKr)", and a "controller (ECU) that drives the pressure control unit (YC), and the front-wheel and rear-wheel supply valves (VKf, VKr)". In the braking control device for a vehicle, the rear-wheel supply valve (VKr) is a linear valve. In addition, the front-wheel supply valve (VKf) may be an on/off valve.

A braking control device for a vehicle according to the present disclosure includes a "pressure control unit (YC) to be electrically driven", "front-wheel and rear-wheel supply paths (HKf, HKr) that supply a brake fluid (BF) pressurized by the pressure control unit (YC) to front-wheel and rear-wheel wheel cylinders (CWf, CWr)", a "front-wheel supply valve (VKf) provided in the front-wheel supply path (HKf)", and a "controller (ECU) that drives the pressure control unit (YC), and the front-wheel supply valve (VKf)". In the braking control device for a vehicle, a linear valve is adopted as the front-wheel supply valve (VKf).

According to the above configuration, front-wheel and rear-wheel brake fluid pressures Pwf and Pwr are increased with a pressure difference between the front-wheel brake fluid pressure Pwf and the rear-wheel brake fluid pressure Pwr. That is, it is possible to apply different fluid pressures to the front wheel and the rear wheel (independent control) with a simplified device configuration. As a result, it is possible to secure the amount of energy regeneration and improve the steering stability of the vehicle at the same time.

DESCRIPTION OF EMBODIMENTS

<Symbols of Configuring Members, Etc. And Subscripts at Ends of Symbols>

In the following description, configuring members, calculation processes, signals, characteristics, and values having the same symbol, such as "CW", have the same function. Subscripts "f" and "r" attached to ends of symbols relating to the respective wheels are comprehensive symbols indicating which wheel they relate to in a front-rear direction of a vehicle. Specifically, "f" relates to a front wheel and "r" relates to a rear wheel. For example, wheel cylinders are described as a front-wheel wheel cylinder CWf and a rear-wheel wheel cylinder CWr. Further, the subscripts "f" and "r" may be omitted. In this case, each symbol represents a generic term. In addition, in a connecting passage HS, the side closer to a master cylinder CM (or the side farther from the wheel cylinder CW) is referred to as an "upper part", and the side closer to the wheel cylinder CW is referred to as a "lower part".

<First Embodiment of Braking Control Device for Vehicle>

Figure 1:
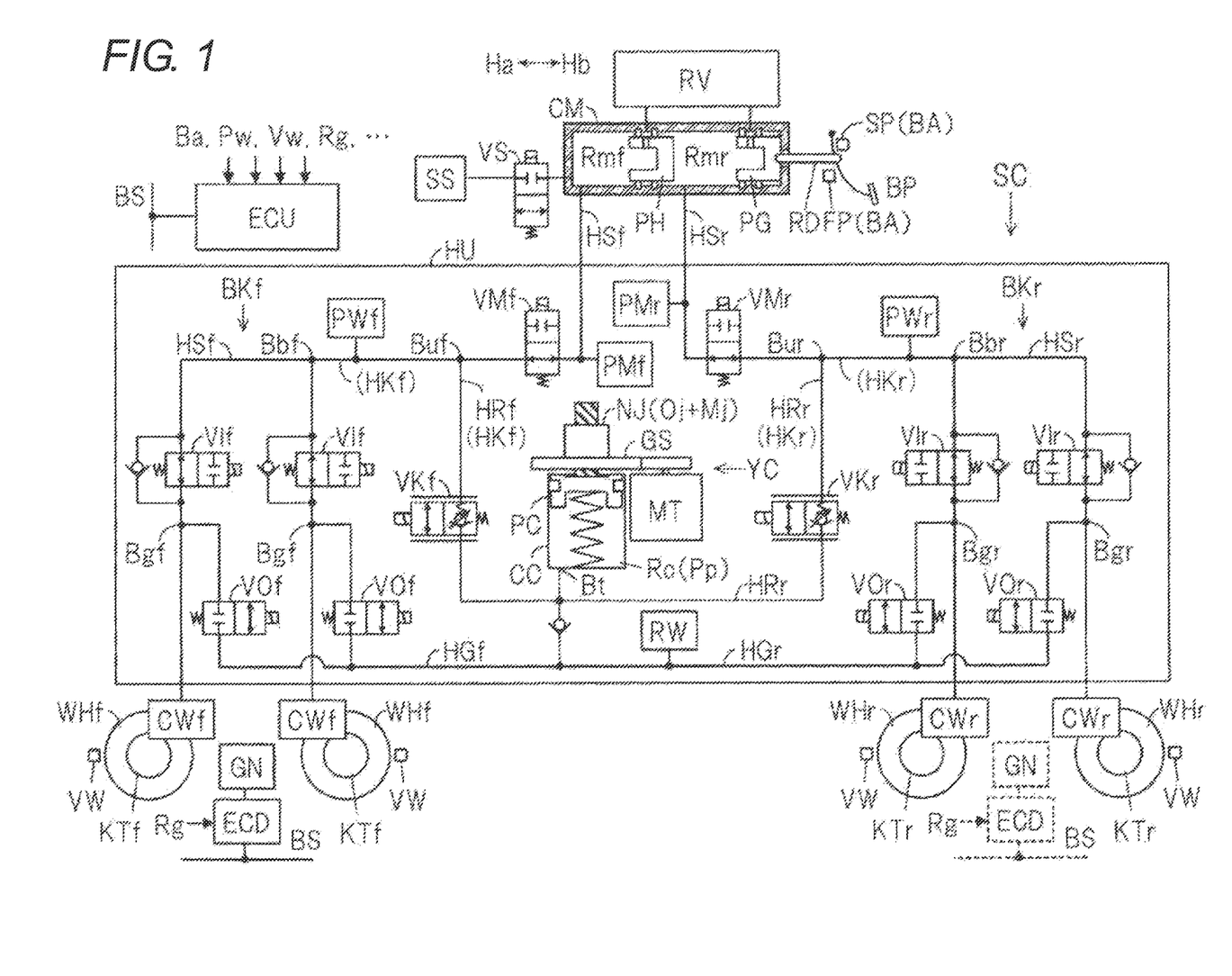
FIG. 1 is an overall configuration diagram for describing a first embodiment of a braking control device SC for a vehicle.

A first embodiment of the braking control device SC according to the disclosure here will be described with reference to an overall configuration diagram of FIG. 1. In the braking control device SC, a so-called front-rear type (also referred to as "type II") is adopted as fluid passages of two systems. In this case, a front-wheel fluid pressure chamber Rmf is connected to two front-wheel wheel cylinders CWf via the fluid passage in a front-wheel braking system BKf, and a rear-wheel fluid pressure chamber Rmr is connected to two rear-wheel wheel cylinders CWr via the fluid passage in a rear-wheel braking system BKr. Here, the "fluid passage" is a passage configured for movement of a brake fluid BF, which is a hydraulic fluid, and corresponds to a brake pipe, a flow path of a fluid unit, a hose, and the like.

For example, at least one of a front wheel WHf and a rear wheel WHr of a vehicle is provided with an electric motor GN for driving (traveling). That is, the vehicle is an electric vehicle such as a hybrid automobile and an electric automobile. The electric motor GN for traveling also functions as a generator for energy regeneration. The electric motor/generator GN is controlled by a driving controller ECD. In the braking control device SC, regenerative cooperative control is executed. In the "regenerative cooperative control", a regenerative braking force Fg by the generator GN and a friction braking force Fm (=Fmf, Fmr) by a brake fluid pressure Pw (=Pwf, Pwr) are controlled in cooperation.

Hereinafter, the braking control device SC will be described assuming a vehicle equipped with the regenerative generator GN on the front wheel WHf of the vehicle. Therefore, the regenerative braking force Fg and a front-wheel friction braking force Fmf can act on the front wheel WHf, and only a rear-wheel friction braking force Fmr can act on the rear wheel WHr.

The vehicle including the braking control device SC is provided with a braking operation member BP, a rotating member KT, the wheel cylinder CW, a master reservoir RV, a master cylinder CM, a braking operation amount sensor BA, and a wheel speed sensor VW.

The braking operation member (for example, a brake pedal) BP is a member operated by a driver to decelerate the vehicle. As the braking operation member BP is operated, a braking torque Tq of the wheel WH is adjusted, and a braking force is generated on the wheel WH. Specifically, the rotating member (for example, a brake disc) KT is fixed to the wheel WH of the vehicle. Then, a brake caliper is arranged so as to sandwich the rotating member KT.

The brake caliper is provided with the wheel cylinder CW. As the pressure (brake fluid pressure) Pw of the brake fluid BF in the wheel cylinder CW is increased, a friction member (for example, a brake pad) is pressed against the rotating member KT. Since the rotating member KT and the wheel WH are fixed so as to rotate integrally, the braking torque Tq is generated on the wheel WH by a frictional force generated at this time. Then, the braking force (friction braking force) is generated on the wheel WH by the braking torque Tq.

The master reservoir (also called "atmospheric pressure reservoir") RV is a tank for the hydraulic fluid, and the brake fluid BF is stored therein. The tandem-type master cylinder CM is mechanically connected to the braking operation member BP via a brake rod RD or the like. Inside the tandem-type master cylinder CM, two fluid pressure chambers (front-wheel and rear-wheel fluid pressure chambers which are also referred to as "front-wheel and rear-wheel master cylinder chambers") Rmf and Rmr by a primary piston PG and a secondary piston PH. When the braking operation member BP is not operated, the front-wheel and rear-wheel fluid pressure chambers Rmf and Rmr of the master cylinder CM and the master reservoir RV are in a communicating state. At this time, if the amount of the brake fluid BF is insufficient in the front-wheel and rear-wheel braking systems BKf and BKr, the brake fluid BF is replenished from the master reservoir RV to the front-wheel and rear-wheel fluid pressure chambers Rmf and Rmr.

When the braking operation member BP is operated by the driver, the primary and secondary pistons PG and PH in the master cylinder CM are pushed in an advancing direction Ha from an initial position, and the master cylinder chamber (fluid pressure chamber) Rm (=Rmf, Rmr) is shut off from the master reservoir RV. Further, when the operation of the braking operation member BP is increased, the pistons PG and PH are moved in the advancing direction Ha, the volume of the fluid pressure chamber Rm decreases, and the brake fluid (hydraulic fluid) BF is discharged from the master cylinder CM. When the operation of the braking operation member BP is reduced, the pistons PG and PH are moved in a retreating direction Hb, the volume of the fluid pressure chamber Rm increases, and the brake fluid BF is returned toward the master cylinder CM.

The front-wheel and rear-wheel fluid pressure chambers Rmf and Rmr of the tandem-type master cylinder CM and the front-wheel and rear-wheel wheel cylinders CWf and CWr are connected by front-wheel and rear-wheel connecting passages (fluid passages) HSf and HSr. The front-wheel and rear-wheel connecting passages HSf and HSr bifurcate at branch portions Bbf and Bbr, respectively, and are connected to the front-wheel and rear-wheel wheel cylinders CWf and CWr, respectively.

The braking operation amount sensor BA detects an operation amount Ba of the braking operation member (brake pedal) BP by the driver. Specifically, as the braking operation amount sensor BA, at least one of a master cylinder fluid pressure sensor PM (=PMf, PMr) that detects the fluid pressure (master cylinder fluid pressure) Pm (=Pmf, Pmr) in the fluid pressure chamber Rm, an operation displacement sensor SP that detects an operation displacement Sp of the braking operation member BP, and an operation force sensor FP that detects an operation force Ep of the braking operation member BP is adopted. That is, the braking operation amount sensor BA is a general term for the master cylinder fluid pressure sensor PM, the operation displacement sensor SP, and the operation force sensor FP, and the operation amount Ba is a general term for the master cylinder fluid pressure Pm, the operation displacement Sp, and the operation force Fp.

The wheel speed sensor VW detects a wheel speed Vw which is a rotation speed of each of the wheels WH. A signal of the wheel speed Vw is used for anti-lock brake control that suppresses the lock tendency of the wheel WH and the like. Each of the wheel speeds Vw detected by the wheel speed sensor VW is input to a braking controller ECU. In the controller ECU, a vehicle body speed Vx is calculated based on the wheel speed Vw.

<<Braking Control Device SC>>

The braking control device SC includes a stroke simulator SS, a simulator valve VS, a fluid unit HU, and the braking controller ECU.

The stroke simulator (also referred to simply as "simulator") SS is provided to generate the operation force Fp on the braking operation member BP. In other words, an operation characteristic of the braking operation member BP (a relationship between the operation displacement Sp and the operation force Fp) is formed by the simulator SS. The simulator SS is connected to the master cylinder CM (for example, front-wheel fluid pressure chamber Rmf). Inside the simulator SS, a simulator piston and an elastic body (for example, a compression spring) are provided. When the brake fluid BF is moved from the front-wheel fluid pressure chamber Rmf into the simulator SS, the simulator piston is pushed by the inflowing brake fluid BF. A force is applied to the simulator piston in a direction of blocking the inflow of the brake fluid BF by the elastic body, and thus, when the braking operation member BP is operated, the operation force Fp depending on the operation displacement Sp is generated.

The simulator valve VS is provided between the front-wheel fluid pressure chamber Rmf and the simulator SS. The simulator valve VS is a normally closed solenoid valve (on/off valve) having an open position and a closed position. In the "on/off valve", the open position and the closed position are selectively realized. When the braking control device SC is activated, the simulator valve VS is opened, and the master cylinder CM and the simulator SS are set to a communicating state. Note that the simulator valve VS may be omitted in a case where the capacity of the front-wheel fluid pressure chamber Rmf is sufficiently greater than the capacity of the front-wheel wheel cylinder CWf. In addition, the simulator SS may be connected to the rear-wheel fluid pressure chamber Rmr. In this case, the simulator valve VS is provided in the rear-wheel braking system BKr.

The fluid unit HU includes front-wheel and rear-wheel separation valves VMf and VMr, front-wheel and rear-wheel master cylinder fluid pressure sensors PMf and PMr, a pressure control unit YC, front-wheel and rear-wheel supply valves VKf and VKr, front-wheel and rear-wheel brake fluid pressure sensors PWf and PWr, front-wheel and rear-wheel inlet valves VIf and VIr, front-wheel and rear-wheel outlet valves VOf and VOr, and a low-pressure reservoir RW.

The front-wheel and rear-wheel separation valves VMf and VMr are provided in the front-wheel and rear-wheel connecting passages HSf and HSr which are the fluid passages. The front-wheel and rear-wheel separation valves VMf and VMr are normally open solenoid valves (on/off valves) each having an open position and a closed position. When the braking control device SC is activated, the front-wheel and rear-wheel separation valves VMf and VMr are closed, and the master cylinder CM and the front-wheel and rear-wheel wheel cylinders CWf and CWr are set to a shut-off state (non-communication state). That is, the fluid connection between the master cylinder CM and each of the front-wheel and rear-wheel wheel cylinders CWf and CWr is separated by the front-wheel and rear-wheel separation valves VMf and VMr at the closed positions.

The front-wheel and rear-wheel master cylinder fluid pressure sensors PMf and PMr are provided on the upper part of the front-wheel and rear-wheel separation valves VMf and VMr so as to detect the fluid pressures of the front-wheel and rear-wheel fluid pressure chamber Rmf and Rmr (front-wheel and rear-wheel master cylinder fluid pressure) Pmf and Pmr. The master cylinder fluid pressure sensor PM (=PMf, PMr) corresponds to the braking operation amount sensor BA, and the master cylinder fluid pressure Pm corresponds to the operation amount Ba. Note that the front-wheel and rear-wheel master cylinder fluid pressures Pmf and Pmr are substantially the same, any one of the front-wheel and rear-wheel master cylinder fluid pressure sensors PMf and PMr can be omitted.

The pressure control unit YC adjusts (increases/maintains/decreases) the fluid pressure (brake fluid pressure) Pw (=Pwf, Pwr) of the wheel cylinder CW (=CWf, CWr) instead of the master cylinder CM. The pressure control unit YC includes an electric motor MT, a speed reducer GS, a rotation/linear motion conversion mechanism (for example, a screw mechanism which is also referred to simply as a "conversion mechanism") NJ, a pressure control piston PC, and a pressure control cylinder CC.

The pressure control unit YC is electrically driven. Specifically, rotational power of the electric motor MT is decelerated by the speed reducer GS and transmitted to the rotation/linear motion conversion mechanism (screw mechanism) NJ in the pressure control unit YC. For example, a small-diameter gear is fixed to an output shaft of the electric motor MT. The small-diameter gear meshes with a large-diameter gear, and its rotating shaft is fixed to a bolt member Oj of the screw mechanism (conversion mechanism) NJ. The screw mechanism NJ includes the bolt member Oj and a nut member Mj. In the screw mechanism NJ, the rotational power of the electric motor MT via the speed reducer GS is converted into linear power of the pressure control piston PC. The conversion into the linear power of the pressure control piston PC is performed when the pressure control piston PC is pushed by the nut member Mj of the screw mechanism NJ. As the screw mechanism NJ, a "sliding screw" such as a trapezoidal screw is adopted. In addition, a "rolling screw" such as a ball screw may be adopted as the screw mechanism NJ.

The pressure control piston PC is inserted into an inner hole of the pressure control cylinder CC to form a "piston/cylinder" combination. Specifically, the fluid pressure chamber Rc (referred to as a "pressure control chamber") is formed by "an inner peripheral surface and a bottom surface of the pressure control cylinder CC" and "an end surface of the pressure control piston PC". A fluid pressure Pp (referred to as an "adjusted fluid pressure") in the pressure control chamber Rc is adjusted by the power of the electric motor MT.

The pressure control chamber Rc of the pressure control unit YC is connected to the front-wheel and rear-wheel connecting passages HSf and HSr via front-wheel and rear-wheel communicating passages (fluid passages) HRf and HRr, and are finally connected to the front-wheel and rear-wheel wheel cylinders CWf and CWr. Specifically, the front-wheel and rear-wheel communicating passages HRf and HRr are the fluid passages linking a discharge portion Bt of the pressure control chamber Rc and lower parts Buf and Bur of the front-wheel and rear-wheel separation valves VMf and VMr provided in the front-wheel and rear-wheel connecting passages HSf and HSr (portions between the front-wheel and rear-wheel separation valves VMf and VMr and the front-wheel and rear-wheel wheel cylinders CWf and CWr).

The brake fluid BF pressurized to the adjusted fluid pressure Pp by the pressure control unit YC is supplied to the front-wheel and rear-wheel wheel cylinders CWf and CWr through front-wheel and rear-wheel supply paths (fluid passages) HKf and HKr. Here, each of the "front-wheel and rear-wheel supply paths HKf and HKr" is formed by each of the front-wheel and rear-wheel communicating passages HRf and HRr and a part of each of the front-wheel and rear-wheel connecting passages HSf and HSr. For example, the front-wheel supply path HKf is the fluid passage linking the portion Bt, the portion Buf, and the portion Bbf. In addition, the rear-wheel supply path HKr is the fluid passage linking the portion Bt, the portion Bur, and the portion Bbr.

The volume of the pressure control chamber Rc changes as the pressure control piston PC is moved. At this time, the front-wheel and rear-wheel separation valves VMf and VMr are closed, and thus, the brake fluid BF is not returned to the front-wheel and rear-wheel fluid pressure chambers Rmf and Rmr, but is moved toward the front-wheel and rear-wheel wheel cylinders CWf and CWr.

When the electric motor MT is driven to rotate in the forward rotation direction, the volume of the pressure control chamber Rc decreases, and the adjusted fluid pressure Pp (that is, the brake fluid pressure Pw) is increased. On the other hand, when the electric motor MT is driven to rotate in the reverse direction, the volume of the pressure control chamber Rc increases, and the brake fluid BF is returned from the front-wheel and rear-wheel wheel cylinders CWf and CWr to the pressure control cylinder CC. As a result, the adjusted fluid pressure Pp (=Pw) is decreased. Note that a return spring (elastic body) is provided inside the pressure control chamber Rc, and the pressure control piston PC is returned to its initial position when the energization of the electric motor MT is stopped.

The front-wheel and rear-wheel supply paths HKf and HKr are provided with the front-wheel and rear-wheel supply valves VKf and VKr. Each of the front-wheel and rear-wheel supply valves VKf and VKr is a linear valve (also referred to as a "proportional valve" or a "differential pressure valve") in which a valve opening amount (lift amount) is continuously controlled. As the front-wheel and rear-wheel supply valves VKf and VKr, a normally closed solenoid valve is used. In the front-wheel and rear-wheel supply valves VKf and VKr, which are normally closed linear valves, the valve opening amount increases as an energization amount increases. A pressure difference between the adjusted fluid pressure Pp and the brake fluid pressure Pw (which is also a differential pressure between the front-wheel brake fluid pressure Pwf and the rear-wheel brake fluid pressure Pwr as will be described later) is controlled by the front-wheel and rear-wheel supply valves VKf and VKr.

As the rear-wheel supply valve VKr, a normally closed solenoid valve (on/off valve) may be adopted. That is, it is essential that the front-wheel supply valve VKf is the normally closed linear valve. However, the rear-wheel supply valve VKr may be the normally closed linear valve or a normally closed on/off valve. For example, when the rear-wheel supply valve VKr is the normally closed on/off valve, the rear-wheel supply valve VKr may be opened when the braking control device SC is activated.

On the other hand, the normally closed linear valve is adopted as the front-wheel supply valve VKf. When a pressure increase is necessary due to the regenerative cooperative control, the energization of the front-wheel supply valve VKf is started to increase its valve opening amount. As a result, a pressure difference (differential pressure) between the front-wheel brake fluid pressure Pwf and the rear-wheel brake fluid pressure Pwr is maintained in a state where the front-wheel brake fluid pressure Pwf is smaller than the rear-wheel brake fluid pressure Pwr (that is, "Pwf<Pwr"), and the front-wheel brake fluid pressure Pwf is increased.

The front-wheel and rear-wheel brake fluid pressure sensors PWf and PWr are provided on the front-wheel and rear-wheel connecting passages HSf and HSr, which are the fluid passages, so as to detect the front-wheel and rear-wheel brake fluid pressures Pwf and Pwr. In the front-wheel and rear-wheel connecting passages HSf and HSr, configurations from the branch portions Bbf and Bbr to the lower part (the side closer to the wheel cylinder CW) are the same.

The inlet valve VI (=VIf, VIr) and the outlet valve VO (=VOf, VOr) are provided such that the brake fluid pressure Pw can be individually controlled by the respective wheels WH for the anti-lock brake control and the like. The normally open inlet valve VI (=VIf, VIr) is provided on the connecting passage HS (=HSf, HSr). Lower parts Bgf and Bgr (that is, portions between the inlet valves VI and the wheel cylinders CW) of the inlet valves VI are connected to the low-pressure reservoir RW via front-wheel and rear-wheel decompression passages (fluid passages) HGf and HGr. The decompression passage HG (=HGf, HGr) is provided with the normally closed outlet valve VO (=VOf, VOr). The decompression passage HG is connected to the pressure control chamber Rc via a check valve. The brake fluid pressure Pw (that is, the friction braking force Fm) of each of the wheels WH can be adjusted independently and individually by controlling the valves VI and VO.

The electric motor MT and the valves VM, VK, VS, VI, and VO are controlled by the braking controller ("electronic control unit" which is also referred to simply as "controller") ECU. The controller ECU includes an electric circuit board on which a microprocessor MP or the like is mounted and a control algorithm programmed in the microprocessor MP. The braking controller ECU is network-connected to a controller of another system (the driving controller ECD or the like) via an in-vehicle communication bus BS. For example, a regeneration amount Rg of the regenerative generator GN is transmitted from the driving controller ECD to the braking controller ECU via the communication bus BS.

The braking controller ECU controls the electric motor MT and the valves (VM and the like) based on various signals (Ba, Pw, Vw, Rg, and the like). Specifically, a motor drive signal Mt for controlling the electric motor MT is calculated based on the control algorithm in the microprocessor MP. Similarly, valve drive signals Vm, Vk, Vs, Vi, and Vo for controlling the valves VM, VK, VS, VI, and VO are calculated. Then, the electric motor and the plurality of valves are driven based on these drive signals (Mt, Vm, Vk, and the like).

In normal braking (in a case where braking is performed according to the operation of the braking operation member BP and the anti-lock brake control is not executed), the operation characteristic of the braking operation member BP is formed by the simulator SS. Then, the fluid pressures (brake fluid pressures) Pwf and Pwr of the front-wheel and rear-wheel wheel cylinders CWf and CWr are adjusted independently (individually) by the front-wheel and rear-wheel supply valves VKf and VKr within a range of "Pwf<Pwr" at the time of increasing the fluid pressures (hereinafter, referred to as "independent control"). In the braking control device SC, the linear valve is adopted as at least the front-wheel supply valve VKf, and thus, the independent control can be achieved while the entire device is simplified.

In a case where regenerative cooperative control is performed in an electric vehicle (an electric automobile, a hybrid automobile, or the like) including an electric motor for traveling (which is also a "generator for energy regeneration") on the front wheel WHf, the friction braking force Fmf of the front wheel WHf and the friction braking force Fmr of the rear wheel WHr are controlled separately by the independent control. As a result, the amount of energy regeneration can be increased, and the steering stability of the vehicle during braking can be improved. Here, the "regenerative cooperative control" is controlling the regenerative braking force Fg by the generator and the friction braking force Fm (=Fmf, Fmr) by the brake fluid pressure Pw (=Pwf, Pwr) in cooperation to efficiently convert kinetic energy of the vehicle in the middle of traveling into electrical energy.

In the above, the braking control device SC for the vehicle provided with the regenerative generator GN on the front wheel WHf has been described. The braking control device SC may be applied to a vehicle in which the regenerative generator GN is provided on the rear wheel WHr (indicated by a broken line). In such a case, it is essential that the rear-wheel supply valve VKr is the normally closed linear valve. However, the front-wheel supply valve VKf may be the normally closed linear valve or the normally closed on/off valve. In the braking control device SC, the front-wheel brake fluid pressure Pwf and the rear-wheel brake fluid pressure Pwr can be independently and individually adjusted within a range of "Pwf≥Pwr" during the execution of the regenerative cooperative control by the front-wheel and rear-wheel supply valves VKf and VKr. Similarly to the above, the amount of energy regeneration can be sufficiently secured, and the steering stability of the vehicle can be improved by the independent control having a differential pressure between the front-wheel brake fluid pressure Pwf and the rear-wheel brake fluid pressure Pwr. In addition, the above-described independent control is achieved in the braking control device SC by adopting the linear valve as at least the rear-wheel supply valve VKr, and thus, the device configuration can be simplified.

<Operation of Braking Control Device SC in Vehicle Provided with Regenerative Generator GN on Front Wheel WHf>

Figure 2:
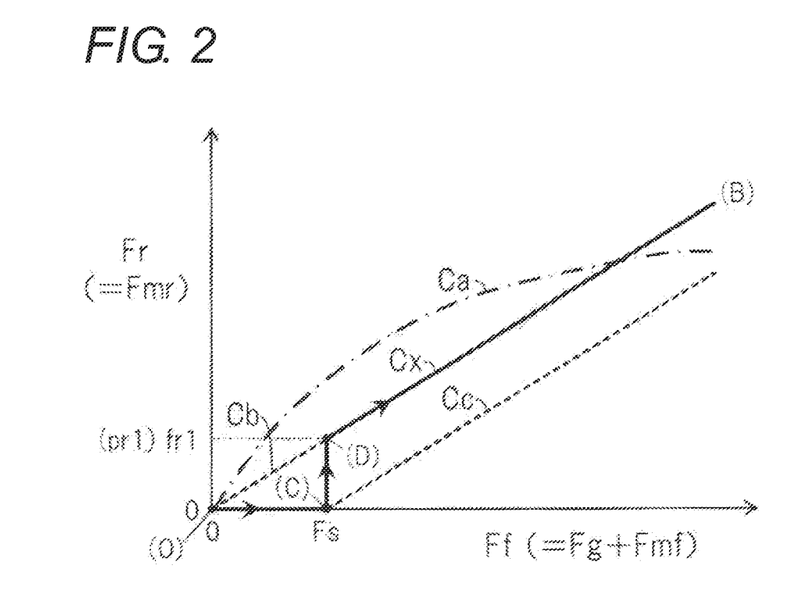
FIG. 2 is a characteristic diagram for describing an operation of the braking control device SC in a vehicle equipped with a regenerative generator GN on a front wheel WHf.

Transition of the regenerative braking force Fg and the front-wheel and rear-wheel friction braking forces Fmf and Fmr in the regenerative cooperative control in the braking control device SC will be described with reference to a characteristic diagram of FIG. 2. Here, the regenerative generator GN is provided on the front wheel WHf. Therefore, the regenerative braking force Fg acts on the front wheel WHf, in addition to the friction braking force Fmf. On the other hand, the generator GN is not provided on the rear wheel WHr, and thus, only the friction braking force Fmr acts on the rear wheel WHr.

A characteristic Ca indicated by an alternate long and short dash line represents a so-called ideal braking force distribution in consideration of changes in ground loads (vertical forces) of the front and rear wheels WHf and WHr accompanying deceleration of the vehicle. In the ideal distribution characteristic Ca, braking forces Ff and Fr of the front and rear wheels WHf and WHr are proportional to dynamic loads (vertical forces acting on the wheels) according to a vehicle deceleration Gx. Therefore, in the ideal distribution characteristic Ca, when the anti-lock brake control is not executed, the front wheel WHf and the rear wheel WHr are locked at the same time regardless of a road surface having any friction coefficient (however, the friction coefficient is uniform), and a total braking force Fv (=Ff+Fr) acting on the vehicle becomes the maximum on the road surface.

A characteristic Cb ("characteristic (O)-(B)" which is referred to as a "reference characteristic") is set in advance as a mutual relationship between the front-wheel braking force Ff and the rear-wheel braking force Fr in a case where the regenerative braking force Fg does not act (that is, "Fg=0"). For example, the reference characteristic Cb is set based on "pressure-receiving areas of the front-wheel and rear-wheel wheel cylinders CWf and CWr", "effective braking radii of the rotating member KTf and KTr", and "friction coefficients of friction materials of the front and rear wheels". Specifically, the reference characteristic Cb is set as the relationship between the front-wheel and rear-wheel braking forces Ff and Fr generated in a case where the front-wheel and rear-wheel brake fluid pressures Pwf and Pwr are increased under a condition that the regenerative braking force Fg is "0" and the front-wheel and rear-wheel brake fluid pressures Pwf and Pwr are equal (that is, "Fg=0, Pwf=Pwr"). Note that a slope of the reference characteristic Cb (that is, "Fr/Ff") is "Hr/Hf=Hr/(1−Hr)". Here, a front wheel ratio Hf is a ratio (=Ff/Fv) of the front-wheel braking force Ff relative to the total braking force Fv (=Ff+Fr), and a rear wheel ratio Hr is a ratio (=Fr/Fv) of the rear-wheel braking force Fr relative to the total braking force F (=Ff+Fr).

In a general vehicle, the pressure-receiving area of the wheel cylinder CW, the effective braking radius of the rotating member KT, and the friction coefficient of the friction material are set so as to make the reference characteristic Cb smaller than the ideal distribution characteristic Ca within a range of normal braking (within a region excluding a region where the maximum braking force is generated) such that the rear wheel WHr is not locked prior to the front wheel WHf. Note that braking force distribution control (so-called EBD control) is executed based on the wheel speed Vw in the region where the maximum braking force is generated such that a deceleration slip of the rear wheel WHr does not become larger than a deceleration slip of the front wheel WHf.

The regenerative cooperative control is executed based on a required braking force Fd and a standard braking force Fs. Here, the required braking force Fd is a required value of the total braking force Fv corresponding to the vehicle deceleration Gx required by the driver (a target value which is a value obtained by converting the deceleration Gx into a braking force). Specifically, the required braking force Fd is determined based on the braking operation amount Ba and a preset calculation map so as to increase as the operation amount Ba of the braking operation member BP increases. In addition, the standard braking force Fs is a value that serves as a standard for the regenerative braking force Fg in the regenerative cooperative control. The standard braking force Fs is determined based on rotation speed equivalent values Ns. The "rotation speed equivalent values Ns" are rotation speeds of configuring members that rotate from the generator GN to the wheel WH. For example, at least one of a rotation speed (rotation speed) Ng of the regenerative generator GN, the wheel speed Vw of the wheel WH (that is, the front wheel WHf) connected to the generator GN, and vehicle body speed Vx calculated based on the wheel speed Vw is adopted as the rotation speed equivalent value Ns. The standard braking force Fs is determined to increase as the rotation speed equivalent value Ns decreases in a case where the rotation speed equivalent value Ns is equal to or more than a first predetermined value no (a region of "Ns≥no"), determined to be an upper limit value fs in a case where the rotation speed equivalent value Ns is less than the first predetermined value no and is equal to or more than a second predetermined value np, which is smaller than the first predetermined value no (a region of "np≤Ns<no"), and determined to decrease as the rotation speed equivalent value Ns decreases in a case where the rotation speed equivalent value Ns is less than the second predetermined value np (region of "Ns<np") based on the preset calculation map accompanying the deceleration of the vehicle.

Hereinafter, the transition of the regenerative braking force Fg and the front-wheel and rear-wheel friction braking forces Fmf and Fmr in the regenerative cooperative control will be described. The characteristic diagram assumes a situation in which the driver gradually increases the operation amount of the braking operation member BP from a non-braking state. In the characteristic diagram, the origin (O) corresponds to the non-braking state (that is, "Ba=0" and "Ff=Fr=0"). When the operation of the braking operation member BP is started, the required braking force Fd is less than the standard braking force Fs and the required braking force Fd can be achieved only by the regenerative braking force Fg at an initial stage of braking, and thus, the friction braking forces Fmf and Fmr are not generated (that is, "Fmf=Emr=0"). At this time, the front-wheel supply valve VKf and the electric motor MT are not energized, the front-wheel supply valve VKf, which is the normally closed linear valve, is closed, and the adjusted fluid pressure Pp is controlled to "0" (that is, "Pp=Pwf=Pwr=0"). Therefore, the total braking force Fv is generated only by the regenerative braking force Fg. This state is maintained until the operation amount Ba of the braking operation member BP is increased and the required braking force Fd reaches the standard braking force Fs. An operating point of the braking force transitions from the origin (O) to a point (C) (the point of "Ff=Fs, Fr=0").

Further, after the operation amount Ba is increased and the regenerative braking force Fg reaches the standard braking force Fs, the required braking force Fd is achieved by the rear-wheel friction braking force Fmr in addition to the regenerative braking force Fg. At this time, the front-wheel friction braking force Fmf is not increased, and the state of "Fmf=0" is maintained. The operating point of the braking force transitions from the point (C) to a point (D) in parallel with a Y axis (Fr axis). In the braking control device SC, the closed state of the front-wheel supply valve VKf is maintained, and the rear-wheel supply valve VKr is opened. For example, the rear-wheel supply valve VKr is turned into a fully open state when being a linear valve, and the rear-wheel supply valve VKr is set to the open position when being an on/off valve. As a result, the brake fluid BF adjusted to the adjusted fluid pressure Pp by the pressure control unit YC is supplied to the rear-wheel wheel cylinder CWr (that is, "Pwr=Pp"). As a result, the operating point of the braking force transitions from the point (C) to the point (D) only by the rear-wheel brake fluid pressure Pwr in the state of "Pwf=0".

When the rear-wheel friction braking force Fmr reaches a value fr1 (that is, the rear-wheel brake fluid pressure Pwr reaches a pressure value pr1 corresponding to the value fr1) and the operating point of the braking force reaches the reference characteristic Cb (point (D)). an increase of the front-wheel friction braking force Fmf is started. In the braking control device SC, the energization of the front-wheel supply valve VKf is started to increase its valve opening amount. As a result, the front-wheel brake fluid pressure Pwf and the rear-wheel brake fluid pressure Pwr are adjusted so as to increase in the state of having a pressure difference (differential pressure). At this time, the front-wheel brake fluid pressure Pwf is lower than the rear-wheel brake fluid pressure Pwr (that is, "Pwf<Pwr") in terms of the magnitude relationship in the differential pressure. As a result, the operating point of the braking force transitions from the point (D) to a point (B) along the reference characteristic Cb. That is, the front-rear distribution of the braking force by the braking control device SC becomes "(O)→(C)→(D)→(B)" accompanying the increase of the braking operation amount Ba as in a characteristic Cx (the transition of the operating point of the braking force).

The front-rear distribution of the braking force in the regenerative cooperative control changes, for example, as in a characteristic Cc in a configuration in which the same fluid pressure is introduced to all of the wheel cylinders CW (that is, a configuration in which the front-wheel and rear-wheel supply valves VKf and VKr are on/off valves and no differential pressure can be generated between the front-wheel brake fluid pressure Pwf and the rear-wheel brake fluid pressure Pwr). The rear-wheel braking force Fr in the characteristic Cc is smaller than the rear-wheel braking force Fr in the ideal distribution characteristic Ca. Thus, in the characteristic Cc, the vehicle stability is secured, but it is difficult to sufficiently utilize the rear-wheel braking force Fr. In the braking control device SC disclosed here, the linear valve is adopted for at least the front-wheel supply valve VKf, and the differential pressure can be generated between the front-wheel brake fluid pressure Pwf and the rear-wheel brake fluid pressure Pwr. As a result, the amount of energy regeneration of the regenerative generator GN is sufficiently secured, and the rear-wheel braking force Fr is sufficiently utilized. In addition, the front-rear distribution of the braking force is optimized, and the steering stability of the vehicle is improved. In addition, the above-described independent control can be achieved by adopting the linear valve as at least the front-wheel supply valve VKf in the braking control device SC, and thus, the configuration of the entire device is simplified.

<Operation of Braking Control Device SC in Vehicle Provided with Regenerative Generator GN on Rear Wheel WHr>

Figure 3:
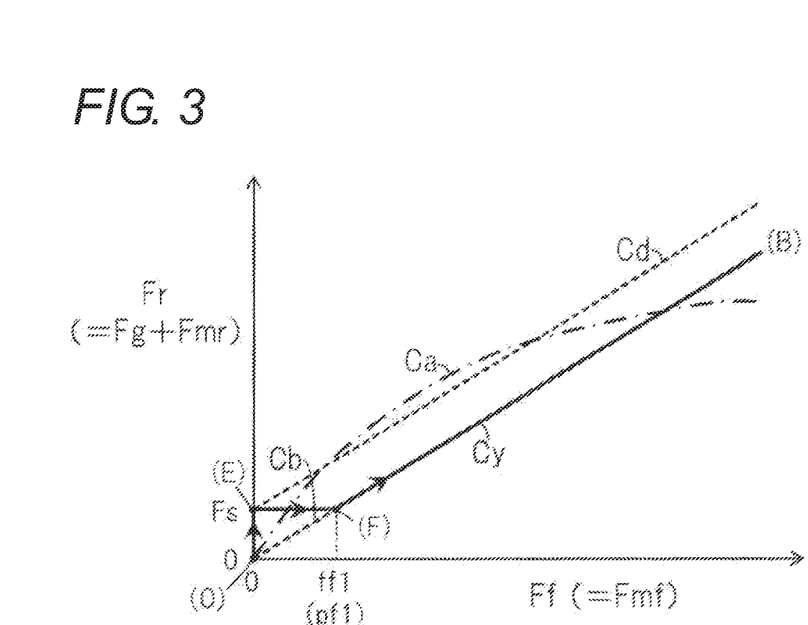
FIG. 3 is a characteristic diagram for describing an operation of the braking control device SC in a vehicle equipped with the regenerative generator GN on a rear wheel WHr.

Transition of the regenerative braking force Fg and the front-wheel and rear-wheel friction braking forces Fmf and Fmr in a case where the braking control device SC is applied to a vehicle provided with the regenerative generator GN on the rear wheel WHr (indicated by the broken line in FIG. 1) will be described with reference to a characteristic diagram of FIG. 3. In this vehicle, only the friction braking force Fmf acts on the front wheel WHf, but the regenerative braking force Fg and the friction braking force Fmr act on the rear wheel WHr.

Similarly to the above, a characteristic Ca of an alternate long and short dash line is a linear diagram of ideal braking force distribution. A reference characteristic Cb is a mutual relationship between the front-wheel braking force Ff and the rear-wheel braking force Fr at "Fg=0", and is set in advance. For example, the reference characteristic Cb depends on the pressure-receiving area of the wheel cylinder, the effective braking radius, and the friction coefficient of the friction material. Specifically, the reference characteristic Cb is set as the relationship between the front-wheel and rear-wheel braking forces Ff and Fr generated in a case where the front-wheel and rear-wheel brake fluid pressures Pwf and Pwr are increased in a state where "Fg=0" and "Pwf=Pwr".

Similarly to the above, the characteristic diagram represents the transition of the braking force in a state where the driver is increasing the operation amount Ba of the braking operation member BP. At an initial stage of braking (state of "Fd<Fs") in which the required braking force Fd (a required value based on the braking operation amount Ba) does not reach the standard braking force Fs (a standard value of the regenerative braking force Fg based on the rotation speed equivalent value Ns), the vehicle is decelerated only by the regenerative braking force Fg, and the front-wheel and rear-wheel braking forces Fmf and Fmr are not generated and still "0". In the braking control device SC, at least the rear-wheel supply valve VKr is in the closed state, and the adjusted fluid pressure Pp by the pressure control unit YC is still "0" (that is, the rear-wheel supply valve VKr and the electric motor MT are not energized). The rear-wheel braking force Fr (=Fg) is increased from "0" only by the regenerative braking force Fg as the braking operation amount Ba is increased. Therefore, an operating point of the braking force changes from the origin (O) to a point (E).

When the braking operation amount Ba is increased and the regenerative braking force Fg becomes insufficient relative to the required braking force Fd (that is, at the time of "Fd=Fs"), an increase of the front-wheel friction braking force Fmf is started. After this time, only the front-wheel friction braking force Fmf is increased in a state where the rear-wheel friction braking force Fmr is maintained at "0". In the braking control device SC, the front-wheel supply valve VKf is opened in a state where the rear-wheel supply valve VKr is closed, and the adjusted fluid pressure Pp (=Pwf) is increased by the pressure control unit YC. The operating point of the braking force changes from the point (E) to a point (F) in parallel with an X axis (Ff axis) only by the front-wheel brake fluid pressure Pwf.

Further, an increase of the rear-wheel friction braking force Fmr is started when the braking operation amount Ba is increased, the front-wheel friction braking force Fmf reaches a value ff1 (that is, the front-wheel brake fluid pressure Pwf reaches a fluid pressure value pf1 corresponding to the value ff1), and the operating point of the braking force reaches the characteristic Cb (point (F)). In the braking control device SC, the energization of the rear-wheel supply valve VKr is started to increase its valve opening amount from the closed state. That is, a fluid pressure difference (differential pressure) between the front-wheel brake fluid pressure Pwf and the rear-wheel brake fluid pressure Pwr is generated. At this time, the front-wheel brake fluid pressure Pwf is higher than the rear-wheel brake fluid pressure Pwr (that is, "Pwf>Pwr") in terms of the magnitude relationship between the front-wheel brake fluid pressure Pwf and the rear-wheel brake fluid pressure Pwr. The operating point of the braking force transitions from the point (F) to a point (B) along the reference characteristic Cb as the front-wheel and rear-wheel brake fluid pressures Pwf and Pwr are increased. A front-rear distribution characteristic (transition of the operating point of the braking force) Cy of the braking force according to the braking control device SC provided with the regenerative generator GN on the rear wheel WHr changes as "(O)→(E)→(F)→(B)" accompanying the increase of the braking operation amount Ba.

In a configuration in which no differential pressure is generated between the front-wheel brake fluid pressure Pwf and the rear-wheel brake fluid pressure Pwr and "Pwf=Pwr", the front-rear distribution of the braking force in the regenerative cooperative control transitions, for example, as in a characteristic Cd. The rear-wheel braking force Fr in the characteristic Cd is larger than the rear-wheel braking force Fr in the ideal distribution characteristic Ca. Thus, in the characteristic Cd, the rear-wheel braking force Fr (=Fg+Fmr) is sufficiently utilized, but the improvement in the vehicle stability is desired. In the braking control device SC according to the present disclosure, the linear valve is adopted as at least the rear-wheel supply valve VKr so that the front-wheel brake fluid pressure Pwf and the rear-wheel brake fluid pressure Pwr are adjusted to increase with the pressure difference (at this time, there is a relationship of "Pwf>Pwr"). With the distribution characteristic Cy, a sufficient amount of energy regeneration can be obtained by the generator GN, and the front-rear distribution of the braking force can be optimized. As a result, it is possible to maintain the vehicle stability and secure the regenerative energy at the same time. In addition, in the braking control device SC, it is possible to generate the differential pressure between the front-wheel brake fluid pressure Pwf and the rear-wheel brake fluid pressure Pwr by adopting the linear valve as at least the rear-wheel supply valve VKr, and the above-described independent control can be executed, and thus, the device configuration is simplified.

<Second Embodiment of Braking Control Device for Vehicle>

Figure 4:
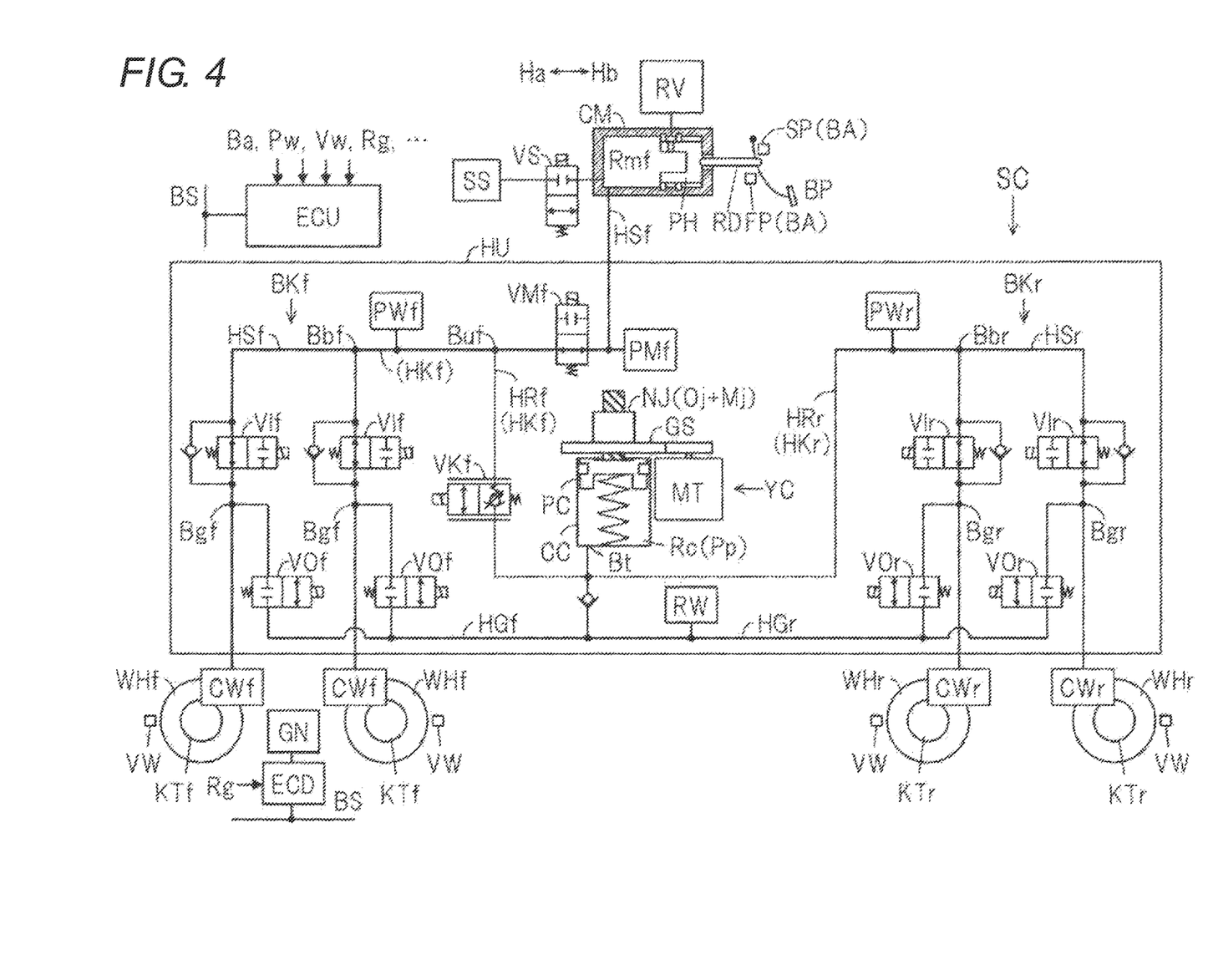
FIG. 4 is an overall configuration diagram for describing a second embodiment of the braking control device SC for a vehicle.

A second embodiment of the braking control device SC according to the present disclosure will be described with reference to an overall configuration diagram of FIG. 4. In the braking control device SC according to the second embodiment, some of components of the rear-wheel braking system BKr are omitted from the braking control device SC according to the first embodiment. For example, the braking control device SC according to the second embodiment is applied to a vehicle provided with an electric motor GN for traveling (which is also a "regenerative generator") on the front wheel WHf.

As described above, configuring members, calculation processes, signals, characteristics, and values having the same symbol have the same function. Regarding subscripts "f" and "r" attached to ends of symbols relating to the respective wheels, "f" relates to a front wheel and "r" relates to a rear wheel. The subscripts "f" and "r" may be omitted. In this case, each symbol represents a generic term.

Hereinafter, differences from the braking control device SC according to the first embodiment will be described. A single-type master cylinder is adopted as the master cylinder CM. Therefore, the piston PG and the rear-wheel fluid pressure chamber Rmr are omitted. Thus, the rear-wheel connecting passage HSr is connected to the rear-wheel wheel cylinder CWr, and is connected to the master cylinder CM via the front-wheel separation valve VMf and the front-wheel supply valve VKf. Accordingly, the rear-wheel master cylinder fluid pressure sensor PMr, the rear-wheel separation valve VMr, and the rear-wheel supply valve VRr are omitted. The rear-wheel wheel cylinder CWr is connected only to the pressure control unit YC (particularly, the pressure control chamber Rc) as a pressurization source. Therefore, the rear-wheel brake fluid pressure Pwr (=Pp) is adjusted by the pressure control unit YC.

In the braking control device SC according to the second embodiment, the brake fluid BF pressurized to the adjusted fluid pressure Pp by the pressure control unit YC is supplied to the rear-wheel wheel cylinder CWr via the rear-wheel supply path HKr (the rear-wheel communicating passage HRr and a part of the rear-wheel connecting passage HSr). The front-wheel supply valve VKf is provided on the front-wheel supply path HKf (the front-wheel communicating passage HRf and a part of the front-wheel connecting passage HSf) even in the second embodiment, which is similar to the first embodiment. The front-wheel supply valve VKf is a normally closed linear valve whose valve opening amount continuously increases as an energization amount increases. In addition, a normally open linear valve may be adopted as the front-wheel supply valve VKf. The front-wheel supply valve VKF can generate a pressure difference between the rear-wheel brake fluid pressure Pwr (=Pp) and the front-wheel brake fluid pressure Pwf within a range of "Pwf<Pwr". That is, the front-wheel and rear-wheel brake fluid pressures Pwf and Pwr can be adjusted separately with a simple configuration.

The braking control device SC of the second embodiment operates in the same manner as described with reference to the characteristic diagram of FIG. 2. Hereinafter, a brief description will be given with reference to FIG. 2.

At an initial stage of braking, "Fd<Fs", and the vehicle is decelerated only by the regenerative braking force Fg (that is, "Fmf=Fmr=0"). At this time, the front-wheel supply valve VKf and the electric motor MT are not energized, the front-wheel supply valve VKf is closed, and the adjusted fluid pressure Pp is controlled to "0" (that is, "Pp=Pwf=Pwr=0"). When the operation amount Ba of the braking operation member BP is increased and "Fd<Fs", this state is maintained (an operating point transitions as "(O) →(C)").

From the time when the operation amount Ba is increased and "Fg=Fs", the rear-wheel friction braking force Fmr is generated in addition to the regenerative braking force Fg. At this time, the front-wheel friction braking force Fmf is still "0" (the operating point transitions as "(C)→(D)". In the braking control device SC, the closed state of the front-wheel supply valve VKf is maintained, and energization of the electric motor MT is started. The brake fluid BF adjusted to the adjusted fluid pressure Pp by the pressure control unit YC is supplied to the rear-wheel wheel cylinder CWr. Therefore, only the rear-wheel brake fluid pressure Pwr (=Pp) is increased in the state of "Pwf=0".

When the operating point of the braking force reaches the reference characteristic Cb (point (D)), an increase of the front-wheel friction braking force Fmf is started. The energization of the front-wheel supply valve VKf is started to increase its valve opening amount. As a result, a differential pressure ("Pwf<Pwr" in terms of the magnitude relationship) is generated between the front-wheel brake fluid pressure Pwf and the rear-wheel brake fluid pressure Pwr, and the front-wheel and rear-wheel brake fluid pressure Pwf and Pwr are increased (the operating point transitions as "(D)→(B)"). Even in the second embodiment, the transition of the operating point of the braking force becomes "the characteristic Cx: (O)→(C)→(D)→(B)" as the braking operation amount Ba is increased.

The second embodiment also has the same effects as those of the first embodiment. The above-described independent control can be achieved by adopting the linear valve as the front-wheel supply valve VKf in the braking control device SC, and thus, the configuration of the entire device is simplified. Then, the independent control achieves securing of the sufficient energy regeneration, the utilization of the rear-wheel braking force, and the improvement of the steering stability of the vehicle.

<Summary of Embodiments and Operational Effects>

The braking control device SC is applied to the vehicle provided with the regenerative generator GN on the front wheel WHf. The braking control device SC includes the "electrically driven pressure control unit YC", the "front-wheel and rear-wheel supply paths HKf and HKr that supply the brake fluid BF pressurized by the pressure control unit YC to the front-wheel and rear-wheel wheel cylinders CWf and CWr", the "front-wheel and rear-wheel supply valves VKf and VKr provided in the front-wheel and rear-wheel supply paths HKf and HKr", and the "controller ECU that drives the pressure control unit YC and the front-wheel and rear-wheel supply valves VKf and VKr". Here, the linear valve is adopted as the front-wheel supply valve VKf. In addition, the on/off valve may be adopted for the rear-wheel supply valve VKr.

The front-wheel and rear-wheel brake fluid pressures Pwf and Pwr are increased with the pressure difference between the front-wheel brake fluid pressure Pwf and the rear-wheel brake fluid pressure Pwr based on the relationship of "Pwf<Pwr". Thus, the amount of energy regeneration of the regenerative generator GN is sufficiently secured, and the rear-wheel braking force Fr is sufficiently utilized. In addition, the front-rear distribution of the braking force is optimized, and the steering stability of the vehicle is improved. In addition, since the linear valve is adopted as at least the front-wheel supply valve VKf in the braking control device SC, it is possible to generate the differential pressure between the front-wheel brake fluid pressure Pwf and the rear-wheel brake fluid pressure Pwr, and the above-described independent control can be executed, and thus, the device configuration is simplified.

The braking control device SC is applied to the vehicle provided with the regenerative generator GN on the rear wheel WHr. The braking control device SC includes the "electrically driven pressure control unit YC", the "front-wheel and rear-wheel supply paths HKf and HKr that supply the brake fluid BF pressurized by the pressure control unit YC to the front-wheel and rear-wheel wheel cylinders CWf and CWr", the "front-wheel and rear-wheel supply valves VKf and VKr provided in the front-wheel and rear-wheel supply paths HKf and HKr", and the "controller ECU that drives the pressure control unit YC, the front-wheel and rear-wheel supply valves VKf and VKr". Here, the linear valve is adopted as the rear-wheel supply valve VKr. The on/off valve may be adopted as the front-wheel supply valve VKf.

The front-wheel and rear-wheel brake fluid pressures Pwf and Pwr are increased with the pressure difference between the front-wheel brake fluid pressure Pwf and the rear-wheel brake fluid pressure Pwr based on the relationship of "Pwf>Pwr". Thus, the amount of energy regeneration of the regenerative generator GN is sufficiently secured, the front-rear distribution of the braking force is optimized, and the steering stability of the vehicle is improved. In addition, since the linear valve is adopted as at least the rear-wheel supply valve VKr in the braking control device SC, it is possible to generate the differential pressure between the front-wheel brake fluid pressure Pwf and the rear-wheel brake fluid pressure Pwr, and the above-described independent control can be executed, and thus, the entire device is simplified.

As above, in sum, the braking control device SC includes the "electrically driven pressure control unit YC", the "front-wheel and rear-wheel supply paths HKf and HKr that supply the brake fluid BF pressurized by the pressure control unit YC to the front-wheel and rear-wheel wheel cylinders CWf and CWr", the "front-wheel and rear-wheel supply valves VKf and VKr provided in the front-wheel and rear-wheel supply paths HKf and HKr", and the "controller ECU that drives the pressure control unit YC and the front-wheel and rear-wheel supply valves VKf and VKr". Here, at least one of the front-wheel and rear-wheel supply valves VKf and VKr is the linear valve.

In addition, a single-type master cylinder may be adopted as the master cylinder CM. In this case, the braking control device SC includes the "electrically driven pressure control unit YC", the "front-wheel and rear-wheel supply paths HKf and HKr that supply the brake fluid BF pressurized by the pressure control unit YC to the front-wheel and rear-wheel wheel cylinders CWf and CWr", the "front-wheel supply valve VKf provided in the front-wheel supply path HKf", and the "controller ECU that drives the pressure control unit YC and the front-wheel supply valve VKf". Here, the front-wheel supply valve VKf is the linear valve.

With the above configuration, it is possible to execute the independent control that can apply different fluid pressures to the front and rear wheels using the simplified device. Then, it is possible to secure the amount of energy regeneration and improve the steering stability of the vehicle at the same time by the independent control.

Other Embodiments

Hereinafter, other embodiments will be described. Other embodiments also have the same effects as described above. The pressure control unit YC in which the adjusted fluid pressure Pp is directly controlled by the power of the electric motor MT has been described as an example in the above embodiments. Instead of this, a pressure control unit in which the brake fluid BF, discharged by a fluid pump driven by the electric motor MT, is adjusted by a pressure control valve (linear valve) may be adopted as the pressure control unit YC (for example, JP 2016-144952 A). In either case, the pressure control unit YC is electrically driven.

The invention claimed is:

1. A braking control device for a vehicle, provided with a regenerative generator on a front wheel of the vehicle, comprising:
    an electrically driven pressure control unit;
    front-wheel and rear-wheel supply paths that supply a brake fluid whose pressure has been adjusted by the pressure control unit to front-wheel and rear-wheel wheel cylinders;
    front-wheel and rear-wheel supply valves provided in the front-wheel and rear-wheel supply paths; and
    a controller that drives the pressure control unit and the front-wheel and rear-wheel supply valves,
    wherein the front-wheel supply valve is a normally-closed linear valve;
    the rear-wheel supply valve is a normally-closed on/off valve; and
    the pressure control unit includes an electric motor, a rotation/linear motion conversion mechanism, a pressure control piston, and a pressure control cylinder.

2. A braking control device for a vehicle, provided with a regenerative generator on a rear wheel of the vehicle, comprising:
    an electrically driven pressure control unit;
    front-wheel and rear-wheel supply paths that supply a brake fluid whose pressure has been adjusted by the pressure control unit to front-wheel and rear-wheel wheel cylinders;
    front-wheel and rear-wheel supply valves provided in the front-wheel and rear-wheel supply paths; and
    a controller that drives the pressure control unit and the front-wheel and rear-wheel supply valves,
    wherein the rear-wheel supply valve is a normally-closed linear valve;
    the front-wheel supply valve is a normally-closed on/off valve; and
    the pressure control unit includes an electric motor, a rotation/linear motion conversion mechanism, a pressure control piston, and a pressure control cylinder.

3. A braking control device for a vehicle, provided with a regenerative generator on a front wheel of the vehicle, comprising:
    an electrically driven pressure control unit;
    front-wheel and rear-wheel supply paths that supply a brake fluid whose pressure has been adjusted by the pressure control unit to front-wheel and rear-wheel wheel cylinders;
    a front-wheel supply valve provided in the front-wheel supply path; and
    a controller that drives the pressure control unit and the front-wheel supply valve,
    wherein the vehicle including the braking control device is provided with a single-type master cylinder; the master cylinder and the front-wheel cylinder are connected by a front-wheel connecting passage; the rear-wheel cylinder is connected to a rear-wheel connecting passage which is connected to the master cylinder via a front-wheel separation valve and the-rear wheel supply path;
    the pressure control unit includes an electric motor, a rotation/linear motion conversion mechanism, a pressure control piston, and a pressure control cylinder; and
    the front-wheel supply valve is a normally-closed linear valve.

* * * * *